United States Patent [19]

Kruishoop et al.

[11] Patent Number: 4,609,437

[45] Date of Patent: Sep. 2, 1986

[54] METHOD OF MANUFACTURING AN OPTICAL FIBER COMPRISING A COATING OF A METAL

[75] Inventors: Johan C. W. Kruishoop; Petrus E. J. Legierse; Johannes Van Ruler; Dirk J. Broer, all of Eindhoven, Netherlands

[73] Assignee: U.S. Philips Corporation, New York, N.Y.

[21] Appl. No.: 710,816

[22] Filed: Mar. 12, 1985

[30] Foreign Application Priority Data

Mar. 16, 1984 [NL] Netherlands .......................... 8400843

[51] Int. Cl.$^4$ ........................... C25D 5/56; C25D 7/00
[52] U.S. Cl. ..................................... 204/28; 204/38.4
[58] Field of Search ..................... 204/27, 38.4, 40, 28

[56] References Cited

U.S. PATENT DOCUMENTS

| | | | |
|---|---|---|---|
| 3,280,012 | 10/1966 | Clinehens | 204/20 |
| 3,957,452 | 5/1976 | Schaer | 204/27 |
| 4,241,105 | 12/1980 | Mayweather | 204/38.4 |
| 4,468,294 | 8/1984 | Hocker | 204/38.4 |

*Primary Examiner*—T. M. Tufariello
*Attorney, Agent, or Firm*—Norman N. Spain

[57] ABSTRACT

Optical fibres consisting of a synthetic resin at least on their outer circumference are continuously provided with a metal coating by electroplating. For this purpose the synthetic resin coating is made electrically conductive, for example, by continuous electroless metallization.

5 Claims, 2 Drawing Figures

METHOD OF MANUFACTURING AN OPTICAL FIBER COMPRISING A COATING OF A METAL

BACKGROUND OF THE INVENTION

The invention relates to a method of manufacturing an optical fiber comprising a coating of a metal, in which method a fibre which consists of a synthetic resin at least on its outer circumference, is provided with an electrically conductive layer, after which a metal coating is electro-plated on it.

Optical fibers comprising a primary coating of a synthetic resin and a coating of a metal contiguous with the primary coating are known per se. Such metal coatings are provided on optical glass fibers so as to protect the optical fiber from water and water vapour.

It has already been suggested to coat an optical glass fiber comprising a primary coating of a synthetic resin with a mixture of a powder of an electrically conductive material and a polymer and to provide thereon a coating of a metal by electro-plating. In this method, the conductive layer must be dried before the metal layer is provided (See abstract of JP Kokai 57-124308). A layer of a mixture of an electrically conductive material and a polymer by nature has a comparatively high electrical resistance. As a result during electro-plating, the current density must be chosen to be comparatively low because otherwise too much thermal energy is generated in the conductive layer. This known method hence is not so suitable for a continuous process, because high speed electro-plating is not very well possible. Another disadvantage is that the process is carried out in two steps which can hardly be linked to a single continuous process. Under these conditions another problem is that a comparatively thick conductive layer is difficult to provide concentrically.

SUMMARY OF THE INVENTION

It is the object of the invention to provide a method of the kind mentioned in the opening paragraph in which the disadvantages of known methods are avoided as much as possible and which can be carried out in a continuous process.

According to the invention this object is achieved by means of a method which is characterized in that, in a continuous process, an electrically conductive layer of metal or an electrically conductive metal oxide is provided on the outer circumference of the fiber and a layer of a metal is then provided by electroplating.

The advantages of the method according to the invention consist in that the metal coating can be provided without a rise in temperature which is detrimental to the optical properties of the optical fiber and that a concentric metal coating can be obtained by means of the method according to the invention continuously and much easier than by means of the known method.

The method according to the invention can be carried out by various manners. First, a thin layer of an electrically conductive material is provided on the primary coating of a synthetic resin. An example of a suitable method is the electroless metallization process in which a metal coating is deposited on the fiber by reduction of the metal salt in question. Suitable metals which can be provided in this manner are, for example, silver, copper, nickel, cobalt, gold, and tin.

It is also possible to provide a thin electrically conductive layer on the fiber by depositing on the fiber a thin layer of an electrically conductive oxide, for example, indium oxide, tin oxide, and the like. For this purpose, the fiber surface is contacted in moist air with the corresponding chloride or a solution thereof in a volatile solvent, of the elements the oxide of which forms the conductive layer.

Of course, a thin conductive layer could also be obtained by physical and chemical vapour deposition (PVD, CVD) and by sputtering. However in these processes, thermal energy may sometimes be released during the deposition so that the underlying synthetic resin coating might be damaged. Further it is difficult to perform said deposition processes continuously and to couple them with the next step in the process, namely the electroplating with a metal layer because these processes have to be carried out in a space sealed from the atmosphere and optionally in a vacuum.

All the above-mentioned coating methods, in particular the electroless metallization process, have the advantage that it presents little or no problems providing a concentric homogeneous conductive layer with far comparatively high conductivity.

In a subsequent step in the method the fibre is electroplated with a coating of a metal. In principle, this coating may be any metal which can be electroplated. Coatings of several metals may also be provided one over the other. Instead of the pure metals, alloys suitable for this purpose may also be provided. It is advantageous effect the coating consists of a ductile metal or a ductile alloy, for example, lead, tin, and alloys thereof.

In a particularly favourable embodiment of the method in accordance with the invention the fiber provided with the primary coating of a synthetic resin is electroless plated continuously in a first step and is electroplated continuously with a metal layer in a second step. For this purpose, the fiber is passed successively through a number of deposition baths alternated by rinsing baths. If necessary, the fiber is passed through the same deposition baths several times to build up a sufficiently thick layer.

In a particularly advantageous embodiment of the method according to the invention a layer of metal is provided continuously by electrodeposition on the electrically conductive layer in at least two successive steps, between which the successive steps the current density is increased and the metal-coated fiber is electrically contacted. This enables initially a metallization at such a low current density that there is no danger for the temperature of the fiber to rise inadmissibly high. As the metal layer becomes thicker in the successive steps, the current density in each step may be increased in accordance with the increased conductance. The temperature can thus be controlled in each step. The current density can also be controlled in each step separately. The result of this embodiment is that a comparatively thick metal layer can rapidly be constructed with a minimum of steps.

In experiments which have led to the invention it has been found that the time the fiber is present in the various baths may be so short that water cannot penetrate into the synthetic resin layer on the fiber; when depositing metal layers an impervious metal layer is already formed in a layer thickness of approximately 0.05 $\mu$m. With this layer thickness a sufficient barrier against a short-lasting contact with water in the various baths is formed. Further growth of the metal layer inter alia serves to fill pin holes, if any.

DETAILED DESCRIPTION OF THE INVENTION

Figure 1:
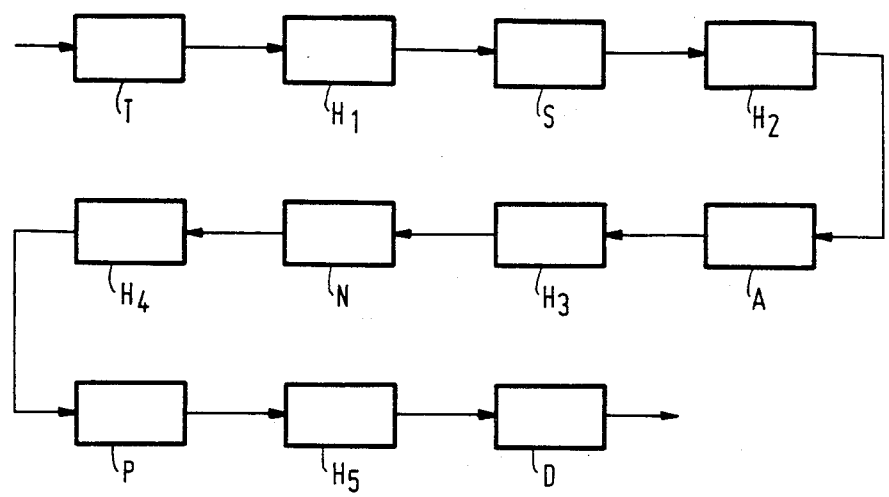
FIG. 1 is a flow chart showing an embodiment of the invention.
Figure 2:
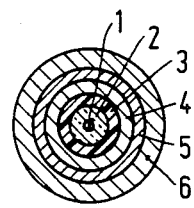
FIG. 2 is a sectional view of a fiber obtained by this embodiment.

The invention will now be described in greater detail with reference to the accompanying drawing FIG. 1 of which shows a flow chart an embodiment of a method according to the invention and of FIG. 2 is a sectional view of a fiber obtained by this embodiment of the method.

An optical fiber which after drawing from the preform has been provided with a primary coating of a synthetic resin, for example consisting of a UV-cured acrylate resin in a thickness of 60 $\mu$m, is guided from a storage reel through a bath T consisting of a solution of 1 g of tannin per liter of deionized water. However, the quantity of tannin may be chosen between the limits 0.001 to 10 g per liter. The optical fiber is then rinsed in bath $H_1$ consisting of deionized water. As a result of the action of tannin on the synthetic resin surface, a better bonding to the metal layers to be provided is obtained. The pretreatment may also be carried out by the exposure of the synthetic resin surface to a corona discharge, optionally succeeded by the treatment with tannin.

The synthetic resin surface treated in this manner is then treated with a tin chloride solution by guiding the fiber through bath S which consists of a solution of 0.1 g of $SnCl_2.2Aq + 0.1$ Ml HCl (37%) per liter of water. In this bath S the synthetic resin surface is provided with $Sn^{2+}$ nuclei. Such a layer may also be obtained by spraying with the said solution. In bath $H_2$, consisting of deionized water, excessive $SnCl_2$ solution is rinsed off.

The surface of the optical fibre is then provided in the conventional manner with a silver layer, preferably according to the aerosol (atomisation) process, in which an aqueous silver salt solution, for example a solution of $AgNO_3$ and $NH_4OH$ in water, and an aqueous reduction agent solution, for example a solution of formalin and, if desired, sodium gluconate in water, are atomized simultaneously on the surface (bath A). This process, as well as the metallisation solutions and reduction agent solutions used, are described, for example, in "The technology of aerosol plating", Donald J. Levy, Technical Proceedings 51st Annual Convention American Electroplaters' Society 14-18 June, St. Louis 1964, pp. 139-149. Various metallisation chemicals are marketed, for example, by Ermax and London Laboratories Ltd. or Merck.

The contact time is at most 1 minute. A silver layer in a thickness of 0.1 $\mu$m to 1 $\mu$m is deposited on the fiber in this manner. The fiber is then guided through a rinsing bath $H_3$ in which liquid dragged along from bath A is rinsed off. A nickel layer in a thickness of 2 $\mu$m is then electroplated on the silver-plated optical fibre in bath N. This bath consists of a solution of nickel sulphamate in water which contains 80 g per liter of nickel, the pH of the bath is brought at 4.5 by means of boric acid. A nickel anode is present in the bath. The silver layer on the fibre forms the cathode. Dependent on the dimensions of the space in which the electroplating is carried out, the fiber may be passed through the bath N one or several times until the desired thickness of the nickel layer has been obtained. After the desired thickness of the nickel layer has been obtained the fiber is guided through a rinsing bath $H_4$ in which the liquid dragged along from bath N is rinsed off with deionized water. A lead-tin alloy having the composition 40 Pb remainder Sn is then electroplated on the nickel layer in bath P. This bath consists of a solution of $Sn(BF_4)$ and $Pb(BF_4)_2$ in water. The solution is brought at a pH$\leq$1 by means of boric acid. The bath comprises approximately 100 g/l of Sn and 50 g/l of Pb in water. The fibre is passed through the bath P until a layer of lead-tin alloy of a sufficient thickness has been deposited. The fibre with metal layers is then rinsed with water in bath $H_5$ and guided through the drying space D in which the fibre is dried by means of warm air. The fibre is then reeled on a storage reel. The fibre is preferably passed through bath N for at least two times and the current density between the two steps is increased by a factor 2.

FIG. 2 is a cross-sectional view of the finished fiber which consists of a core 1 having a diameter of 50 $\mu$m of $GeO_2$-doped quartz glass, the doping being distributed in the core in such manner that the refractive index increases from the circumference of the core to the axis according to a parabolic curve. The cladding 2 of the fiber consists of undoped quartz glass in a thickness of 37.5 $\mu$m.

The composition and build-up of the fiber in itself is of no significance for the method according to the invention. It may equally well be carried out with monomode fibers and graded index fibers and fibers of different dimensions and of different types of glass or synthetic resins.

A synthetic resin coating 3 in a thickness of 60 $\mu$m is provided on the fiber after drawing from the preform. Synthetic resins suitable for this purpose which can also be metallized suitably are, for example, UV or E.B. cured acrylate resins, for example, based on polyurethane, acrylates, epoxy acrylates or polyester acrylates. Thermally cured silicone rubbers or epoxy resins may also be used.

A layer 4 of silver in a thickness of 0.2 $\mu$m, a layer 5 of nickel in a thickness of 2 $\mu$m, and a layer 6 of a lead-tin alloy (40 Pb remainder Sn) are successively provided on the synthetic resin coating 3. The overall metal layer thickness is approximately 10-20 $\mu$m.

It has been described in the embodiment how an optical glass fiber according to the invention can be coated with a metal layer. Optical fibres which consist entirely of a synthetic resin can be provided with a metal layer in a similar manner.

A fiber coated with a metal layer by means of the method according to the invention can withstand water and water vapour. The metal-coated fibres cannot take up any static charge, so that the processibility is promoted. The dimensional stability of fibers consisting entirely of a synthetic resin is increased.

What is claimed is:

1. A method of manufacturing an optical fiber with a coating of a metal, in which method a fiber, at least the outer circumference of which consists of a synthetic resin, is provided with an electrically conductive layer upon which conductive layer a metal coating is provided by electroplating, characterized in that, in a continuous process, an electrically conductive layer of metal is provided on said fiber by the electrodeless deposition achieved by the reduction of a metal salt applied to said outer circumference and a layer of a metal is then provided on said electrically conductive layer by electroplating.

2. A method as claimed in claim 1, characterized in that silver, copper, cobalt, nickel, gold or tin is provided on the outer circumference of the fibre by electroless metallization.

3. A method as claimed in claim 1, characterized in that a layer of a metal is provided continuously by electroplating on the electrically conductive layer in at least two successive steps, in which the current density is increased and the metal-coated fibre is electrically contacted between the successive steps.

4. A method of manufacturing an optical fiber with a coating of a metal, in which method a fiber at least the outer circumference of which consists of a synthetic resin, is provided with an electrically conductive layer upon which conductive layer a metal coating is provided by electroplating, characterized in that, in a continuous process, an electrically conductive metal oxide is provided on said fiber and a layer of a metal is then provided on said conductive metal oxide layer by electroplating.

5. A method as claimed in claim 4, characterized in that a layer of a metal is provided continuously by electroplating on the electrically conductive layer in at least two successive steps, in which the current density is increased and the metal-coated fiber is electrically contacted between the successive steps.

* * * * *